United States Patent
Große et al.

(10) Patent No.: US 11,776,137 B2
(45) Date of Patent: Oct. 3, 2023

(54) SYSTEMS AND METHODS FOR DETECTING MOTION DURING 3D DATA RECONSTRUCTION

(71) Applicant: Cognex Corporation, Natick, MA (US)

(72) Inventors: Marcus Große, Jena (DE); Bastian Harendt, Jena (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/678,113

(22) Filed: Feb. 23, 2022

(65) Prior Publication Data

US 2022/0230332 A1 Jul. 21, 2022

Related U.S. Application Data

(63) Continuation of application No. 16/457,881, filed on Jun. 28, 2019, now Pat. No. 11,288,819.

(51) Int. Cl.
*G06T 7/246* (2017.01)
*G06T 7/285* (2017.01)
*G06T 7/00* (2017.01)

(52) U.S. Cl.
CPC .............. *G06T 7/248* (2017.01); *G06T 7/285* (2017.01); *G06T 7/97* (2017.01); *G06T 2207/10012* (2013.01); *G06T 2207/20076* (2013.01)

(58) Field of Classification Search
None
See application file for complete search history.

(56) References Cited

U.S. PATENT DOCUMENTS

| 11,288,819 B2 | 3/2022 | Große et al. |
| 2005/0244033 A1* | 11/2005 | Ekin ............. H04N 7/181 382/103 |
| 2009/0129666 A1* | 5/2009 | Goevert ............ G06T 7/97 348/47 |

(Continued)

FOREIGN PATENT DOCUMENTS

WO WO 2017/220598 A1 12/2017

OTHER PUBLICATIONS

Temporal Consistent Fast Stereo Matching for ADAS. Ansari et al. (Year: 2010).*

(Continued)

*Primary Examiner* — Delomia L Gilliard
(74) *Attorney, Agent, or Firm* — Wolf, Greenfield & Sacks, P.C.

(57) ABSTRACT

In some aspects, the techniques described herein relate to systems, methods, and computer readable media for detecting movement in a scene. A first temporal pixel image is generated based on a first set of images of a scene over time, and a second temporal pixel image is generated based on a second set of images. One or more derived values are determined based on values of the temporal pixels in the first temporal pixel image, the second temporal pixel image, or both. Correspondence data is determined based on the first temporal pixel image and the second temporal pixel image indicative of a set of correspondences between image points of the first set of images and image points of the second set of images. An indication of whether there is a likelihood of motion in the scene is determined based on the one or more derived values and the correspondence data.

20 Claims, 12 Drawing Sheets

(56) References Cited

U.S. PATENT DOCUMENTS

| | | | |
|---|---|---|---|
| 2011/0043706 A1* | 2/2011 | Van Beek | H04N 19/17 348/E5.066 |
| 2015/0015718 A1 | 1/2015 | Fujimatsu et al. | |
| 2019/0325598 A1* | 10/2019 | Große | H04N 13/139 |
| 2020/0172098 A1* | 6/2020 | Abrahams | B60W 30/09 |
| 2020/0410693 A1 | 12/2020 | Große et al. | |

OTHER PUBLICATIONS

Periodic Motion Detection and Segmentation via Approximate Sequence Alignment. Laptev et al. (Year: 2005).*

Laptev et al., Periodic Motion Detection and Segmentation via Approximate Sequence Alignment. In Tenth IEEE International Conference on Computer Vision (ICCV'05); Oct. 17, 2005; vol. 1, pp. 816-823.

Swirski et al., 3Deflicker from Motion. Proc. IEEE International Conference on Computational Photography (ICCP) 2013. 10 pages.

Zhang et al., Real-Time Scalable Depth Sensing with Hybrid Structured Light Illumination. IEEE Transactions on Imaging Processing. Jan. 1, 2014;23(1):97-109.

* cited by examiner

SYSTEMS AND METHODS FOR DETECTING MOTION DURING 3D DATA RECONSTRUCTION

RELATED APPLICATIONS

This application is a continuation of and claims priority under 35 U.S.C. § 120 to U.S. application Ser. No. 16/457,881, filed on Jun. 28, 2019, entitled "SYSTEMS AND METHODS FOR DETECTING MOTION DURING 3D DATA RECONSTRUCTION," which is hereby incorporated by reference herein in its entirety.

TECHNICAL FIELD

The techniques described herein relate generally to detecting motion during three-dimensional (3D) reconstruction, and in particular to detecting motion of a scene during 3D reconstruction using two-dimensional images captured of the scene.

BACKGROUND

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras directed at an area of interest, a frame grabber/image processing elements that capture and transmit images, a computer or onboard processing device, and a user interface for running the machine vision software application and manipulating the captured images, and appropriate illumination on the area of interest.

One form of 3D vision system is based upon stereo cameras employing at least two cameras arranged in a side-by-side relationship with a baseline of one-to-several inches therebetween. Stereo-vision based systems in general are based on epipolar geometry and image rectification. They may use correlation based methods or combining with relaxation techniques to find the correspondence in rectified images from two or more cameras. However, conventional stereo vision systems are limited in their ability to detect motion when creating three-dimensional data reconstructions of objects.

SUMMARY

In some aspects, systems, methods, and computer readable media are provided for detecting motion during 3D reconstruction of a scene.

Some aspects relate to a system for detecting movement in a scene. The system includes a processor in communication with memory, the processor being configured to execute instructions stored in memory that cause the processor to: access a first set of images and a second set of images of a scene over time; generate, based on the first set of images, a first temporal pixel image comprising a first set of temporal pixels, wherein each temporal pixel in the first set of temporal pixels comprises a set of pixel values at an associated position from each image of the first set of images; generate, based on the second set of images, a second temporal pixel image comprising a second set of temporal pixels, wherein each temporal pixel in the second set of temporal pixels comprises a set of pixel values at an associated position from each image of the second set of images; determine one or more derived values based on values of the temporal pixels in the first temporal pixel image, the second temporal pixel image, or both; determine, based on the first temporal pixel image and the second temporal pixel image, correspondence data indicative of a set of correspondences between image points of the first set of images and image points of the second set of images; and determine, based on the one or more derived values and the correspondence data, an indication of whether there is a likelihood of motion in the scene.

In some examples, determining the one or more derived values includes determining a first set of derived values based on values of the temporal pixels in the first temporal pixel image, and determining a second set of derived values based on values of the temporal pixels in the second temporal pixel image.

In some examples, determining the one or more derived values includes determining, for each temporal pixel of a first set of temporal pixels of the first temporal pixel image, first average data indicative of an average of values of the temporal pixel, and determining, for each temporal pixel of the first set of temporal pixels, first deviation data indicative of a deviation of values of the temporal pixel.

In some examples, determining the one or more derived values further includes determining, for each temporal pixel of a second set of temporal pixels of the second temporal pixel image, second average data indicative of an average of values of the temporal pixel, and determining, for each temporal pixel of the second set of temporal pixels, second deviation data indicative of a deviation of values of the temporal pixel. Calculating the first average data can include calculating, for each temporal pixel in the first set of temporal pixels: a temporal average of intensity values of the temporal pixel; and a root mean square deviation of the intensity values of the temporal pixel.

In some examples, determining the indication includes determining a plurality of regions of the first temporal pixel image, the second temporal pixel image, or both, and determining, for each region of the plurality of regions, an average of the one or more derived values associated with the region, a correspondence indication based on correspondences associated with the region, and determining, based on the average and the correspondence indication, a region indication of whether there is a likelihood of motion in the region. Determining the region indication can include determining the average meets a first metric, determining the correspondence indication meets a second metric, and generating the region indication to indicate a likelihood of motion in the region. An indication to indicate a likelihood of motion in the scene can be determined based on a set of region indications associated with each region of the plurality of regions.

In some examples, each image in the first set of images and the second set of images captures an associated portion of a light pattern projected onto the scene, each image in the first set of images is of a first perspective of the scene, and each image in the second set of images is of a second perspective of the scene.

In some examples, each image in the first set of images is captured by a camera, and each image in the second set of images comprises a portion of a pattern sequence projected onto the scene by a projector.

Some embodiments relate to a computerized method for detecting movement in a scene. The method includes: accessing a first set of images and a second set of images of a scene over time; generating, based on the first set of images, a first temporal pixel image comprising a first set of temporal pixels, wherein each temporal pixel in the first set of temporal pixels comprises a set of pixel values at an associated position from each image of the first set of images; generating, based on the second set of images, a second temporal pixel image comprising a second set of temporal pixels, wherein each temporal pixel in the second set of temporal pixels comprises a set of pixel values at an associated position from each image of the second set of images; determining one or more derived values based on values of the temporal pixels in the first temporal pixel image, the second temporal pixel image, or both; determining, based on the first temporal pixel image and the second temporal pixel image, correspondence data indicative of a set of correspondences between image points of the first set of images and image points of the second set of images; and determining, based on the one or more derived values and the correspondence data, an indication of whether there is a likelihood of motion in the scene.

In some examples, determining the one or more derived values includes determining a first set of derived values based on values of the temporal pixels in the first temporal pixel image, and determining a second set of derived values based on values of the temporal pixels in the second temporal pixel image.

In some examples, determining the one or more derived values includes determining, for each temporal pixel of a first set of temporal pixels of the first temporal pixel image, first average data indicative of an average of values of the temporal pixel, and determining, for each temporal pixel of the first set of temporal pixels, first deviation data indicative of a deviation of values of the temporal pixel. Determining the one or more derived values can further include determining, for each temporal pixel of a second set of temporal pixels of the second temporal pixel image, second average data indicative of an average of values of the temporal pixel, and determining, for each temporal pixel of the second set of temporal pixels, second deviation data indicative of a deviation of values of the temporal pixel. Calculating the first average data can include calculating, for each temporal pixel in the first set of temporal pixels, a temporal average of intensity values of the temporal pixel, and a root mean square deviation of the intensity values of the temporal pixel.

In some examples, determining the indication includes determining a plurality of regions of the first temporal pixel image, the second temporal pixel image, or both, and determining, for each region of the plurality of regions, an average of the one or more derived values associated with the region, a correspondence indication based on correspondences associated with the region, and determining, based on the average and the correspondence indication, a region indication of whether there is a likelihood of motion in the region. Determining the region indication can include determining the average meets a first metric, determining the correspondence indication meets a second metric, and generating the region indication to indicate a likelihood of motion in the region. An indication to indicate a likelihood of motion in the scene can be determined based on a set of region indications associated with each region of the plurality of regions.

In some examples, each image in the first set of images and the second set of images captures an associated portion of a light pattern projected onto the scene, each image in the first set of images is of a first perspective of the scene, and each image in the second set of images is of a second perspective of the scene.

Some aspects relate to at least one non-transitory computer-readable storage medium. The at least one non-transitory computer-readable storage medium stores processor-executable instructions that, when executed by at least one computer hardware processor, cause the at least one computer hardware processor to perform the acts of: accessing a first set of images and a second set of images of a scene over time; generating, based on the first set of images, a first temporal pixel image comprising a first set of temporal pixels, wherein each temporal pixel in the first set of temporal pixels comprises a set of pixel values at an associated position from each image of the first set of images; generating, based on the second set of images, a second temporal pixel image comprising a second set of temporal pixels, wherein each temporal pixel in the second set of temporal pixels comprises a set of pixel values at an associated position from each image of the second set of images; determining one or more derived values based on values of the temporal pixels in the first temporal pixel image, the second temporal pixel image, or both; determining, based on the first temporal pixel image and the second temporal pixel image, correspondence data indicative of a set of correspondences between image points of the first set of images and image points of the second set of images; and determining, based on the one or more derived values and the correspondence data, an indication of whether there is a likelihood of motion in the scene.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
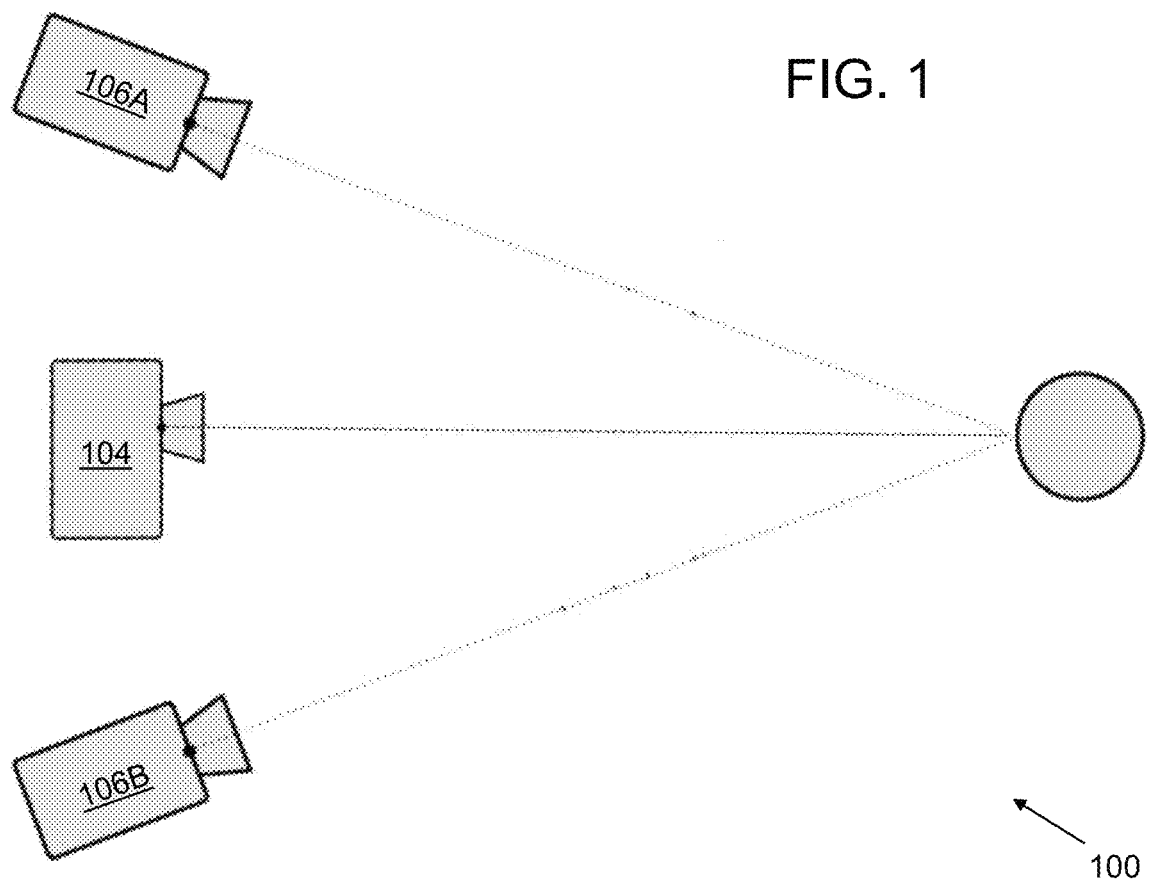
FIG. 1 shows an exemplary configuration with a projector and two cameras that are arranged to capture images of a scene including one or more objects in a manner consistent to produce stereo image correspondence, according to some embodiments.

The techniques described herein relate generally to detecting motion in a scene during three-dimensional (3D) reconstruction of the scene from two-dimensional images. The inventors have discovered and appreciated that imaging applications, such as singulation applications that singulate objects using 3D data, such as for picking, packing, and/or the like, can be affected by motion. For example, for an item picking application, the 3D data can be used to find the location of an object and to determine a picking point that is used to approach the location to try to pick the object. If there is a change of the object's position in the scene between the start of the period that captures images of the scene for 3D reconstruction and the time the object is attempted to be picked (e.g. if an item chute is filled with new objects while the measurement takes place), the pick point may not be valid. For example, if the specific object has not moved, or not moved far enough, then the pick point may still be valid and can result in a successful pick. However, if the specific object has moved too far, or is now covered by another object, then the pick point may not be valid. If the pick point is not valid, then the attempted pick will likely not be successful (e.g., no pick), the wrong item may be picked, or there could be a double pick. Invalid pick points can greatly reduce throughput of the singulation process, e.g., since the pick error needs to be checked for, and another pick has to be conducted after the pick error has been resolved. Therefore, invalid pick points can reduce throughput and increase the picking error rate.

The techniques described herein can be used to recognize object motion before providing a pick point to the customer. In some embodiments, the techniques use data acquired for 3D-reconstruction to determine whether there has been movement in the scene while the images were acquired. If movement is detected in the scene, then the techniques can skip determining a pick point for the scene, and to instead re-capture the data in order to obtain sufficiently motion-free data. By leveraging information used for and/or calculated as part of a 3D-reconstruction process, the techniques can execute much faster than other approaches used to detect movement in images. For example, the present techniques can execute in less than 2 ms, while an optical-flow approach can take 400 ms or more. For example, optical-flow approaches can be time consuming due to the computation required to track patterns in a scene (e.g., box textures, such as letters or barcodes). For example, such techniques often require segmenting objects and tracking the objects across images over time. The present techniques avoid needing to perform such computationally expensive processing, and instead can leverage data generated as part of the 3D reconstruction process.

In some embodiments, the techniques can include detecting motion using structured light 3D sensing techniques that project a structured light pattern on the scene. The techniques can obtain stereo sequences of images over time of the scene while the scene is illuminated by the structured light pattern. The techniques can use stereo image correspondences of temporal image sequences by exploiting local correspondence density, which reflects the number of correspondences found between the stereo image sequences for a particular region. In some embodiments, metrics such as a temporal average and/or temporal deviation can be computed for each temporal image pixel. Spatial average values can be created for regions of the temporal image sequences for the temporal average and/or temporal deviation. A correspondence density value can be determined for each region, such as by dividing the number of found correspondences for the region by the maximum amount of possible correspondences in the region. A quality criterion can be calculated for each region, such as by using prior calculated values. The motion state (e.g., motion, some motion, no motion) can be determined for each region using the computed quality criterion. For example, if the correspondence density is smaller than a threshold, the temporal deviation average is higher than a threshold, and the temporal deviation value average divided by the temporal average value is higher than a threshold, then motion may be determined for the region.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an illustrative embodiment 100 of a machine vision system with a projector 104 and two cameras 106A, 106B (collectively, cameras 106) that are arranged to capture images of an object or scene 102 in a manner consistent to produce stereo image correspondence. In some embodiments, the projector 104 is employed in order to temporally code image sequences of an object captured using multiple cameras 106. For example, the projector 104 may project a rotating random pattern on the object, and each camera may capture an image sequence including 12-16 images (or some other number of images) of the object. Each image comprises a set of pixels that make up the image. In some embodiments, the light pattern may shift in horizontal and/or vertical directions such that the pattern rotates over the object or scene (e.g., without the pattern itself rotating clockwise or counter-clockwise).

Each of the cameras 106 can include a charge-coupled device (CCD) image sensor, a complementary metal-oxide semiconductor (CMOS) image sensor, or another suitable image sensor. In some embodiments, each of the cameras 106 can have a rolling shutter, a global shutter, or another suitable shutter type. In some embodiments, each of the cameras 106 can have a GigE Vision interface, a Universal Serial Bus (USB) interface, a coaxial interface, a FIRE-WIRE interface, or another suitable interface. In some embodiments, each of the cameras 106 can have one or more smart functions. In some embodiments, each of the cameras 106 can have a C-mount lens, an F-mount lens, an S-mount lens, or another suitable lens type. In some embodiments, each of the cameras 106 can have a spectral filter adapted to a projector, e.g., projector 104, to block environmental light outside the spectral range of the projector.

Figure 2:
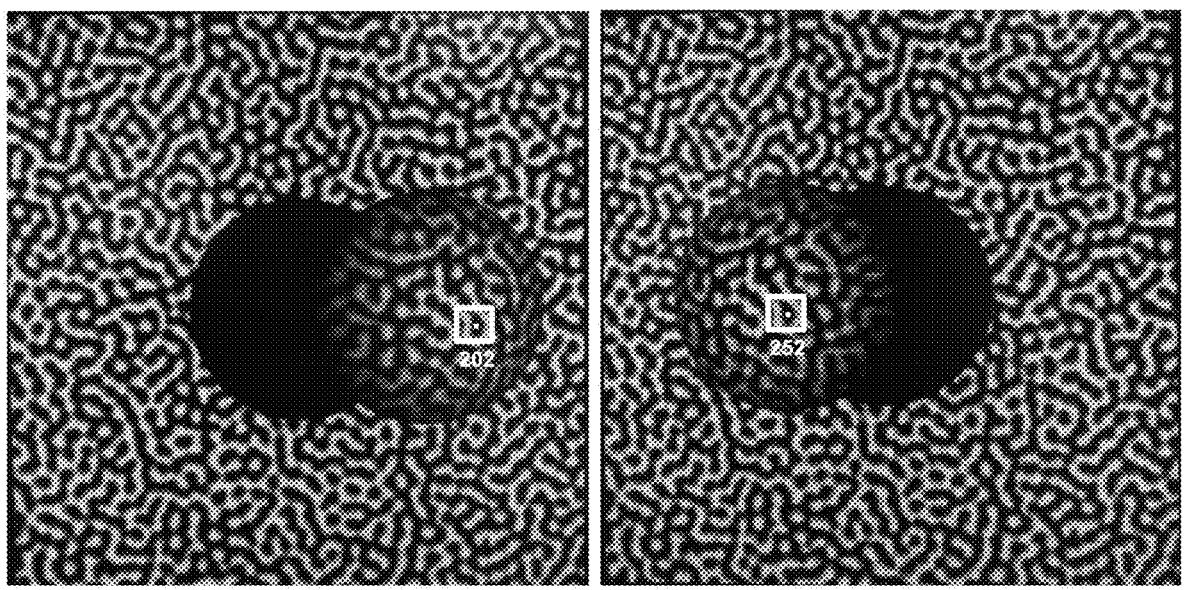
FIG. 2 shows an exemplary pair of stereo images corresponding to one of a series of projected light patterns, according to some embodiments.

FIG. 2 shows an exemplary pair of stereo images 200 and 250 corresponding to one of a series of projected light patterns. For example, the projector 104 may project a light pattern on the object, and the cameras 106 may capture the stereo images 200 and 250. In some embodiments, in order to reconstruct three-dimensional data from stereo image sequences from two cameras, corresponding pairs of pixels, such as pixels 202 and 252, may need to be found between the images from each camera.

Figure 3:
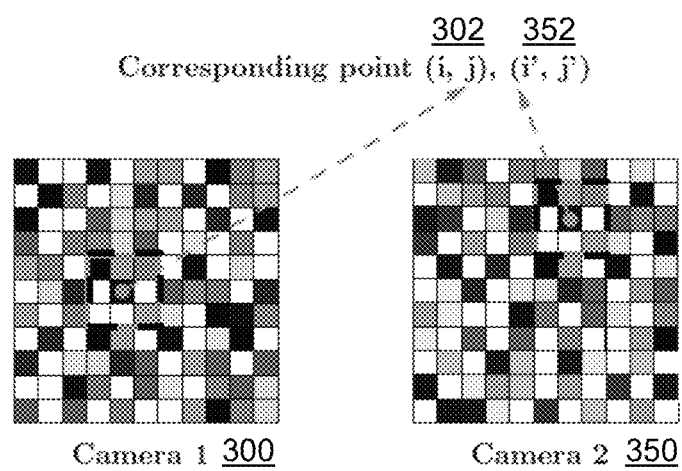
FIG. 3 shows an illustrative pair of stereo images of a scene, according to some embodiments.
Figure 4:
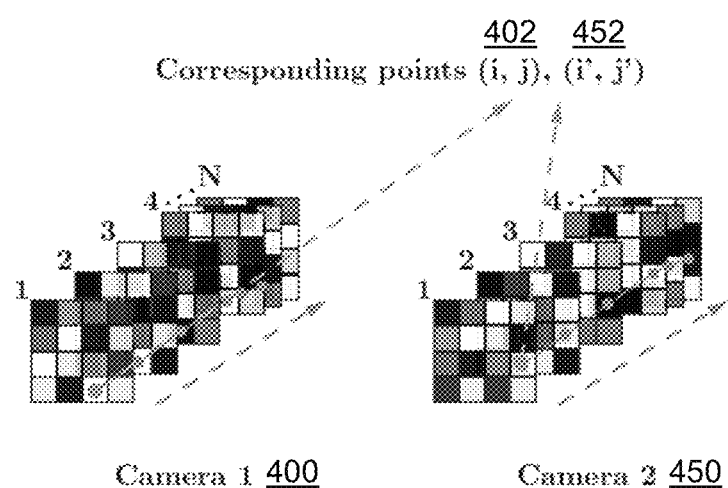
FIG. 4 shows an illustrative pair of stereo-temporal image sequences corresponding to a series of light patterns projected on a scene, according to some embodiments.

FIG. 3 shows an illustrative pair of stereo images 300 and 350 (and associated pixels) with corresponding pixels 302 and 352, which represent the same portion of the pattern projected in the two images 300 and 350. For example, as discussed above, the projector 104 may project a light pattern on the scene, and the cameras 106 may capture the stereo images 300 and 350. In some embodiments, in order to reconstruct three-dimensional data from stereo image sequences from two cameras, corresponding pairs of pixels, such as pixels 302 and 352, may need to be found between the images from each camera. In some embodiments, sequences of stereo images captured over time are used to identify correspondences. Following from the single pair of stereo images shown in FIG. 3, FIG. 4 shows, when the projector 104 successively projects different light patterns on the scene over time, the cameras 106A, 106B may capture the stereo-temporal image sequences 400 and 450 with corresponding temporal pixels 402 and 452, which capture a fingerprint of the intensity of the pixel over time. Each of cameras 106A, 106B may capture a sequences of images 1, 2, 3, 4, . . . N over time. Temporal pixels 402 and 452 are based on the pixels (i,j) and (i',j') across the stereo-temporal image sequences 400 and 450, respectively. Over time, each temporal pixel includes an ordered list of gray values: G_i_j_t where t indicates the discrete temporal instances 1, 2, 3, 4, . . . N.

In some embodiments, while two cameras 106 are shown in FIG. 1, systems can be deployed with only one camera. For example, for a single-camera scenario, a projector can be configured to projects a known light-structure (e.g., such that the projector is used as an inverse camera). One of the temporal image sequences can be captured by the camera, and the other temporal image sequence (e.g., used for establishing correspondences and the like, as described herein) can be determined based on the projected pattern structure or pattern structure sequence. For example, correspondences can be established between acquired image-sequences from the single camera to the static stored pattern sequence projected by the projector. Therefore, while some of the examples discussed herein refer to using multiple cameras, this is for illustrative purposes only and it should be understood that the techniques described herein can be used with systems with just one camera, or more than two cameras.

In some embodiments, a normalized cross-correlation algorithm using the temporal images or only a subset of the temporal images may be applied to the two image sequences in order to determine the corresponding pairs of pixels from each image (e.g., that have similar temporal gray values). For example, for each pixel of the first camera, the potentially corresponding pixels can be retrieved by performing a normalized cross-correlation with all feasible candidates along the epipolar line in the second camera with a threshold to compensate for deviation due to calibration of the cameras, e.g., +/−one pixel or another suitable value.

In some aspects, the described systems and methods perform a correspondence assignment between image points in a subset or all paired images from the stereo image sequences in a plurality of steps. As a first exemplary step, an initial correspondence search is performed to derive rough estimates of potential correspondences between image points in a subset or all paired images from the stereo image sequences. The initial correspondence search can be performed using temporal pixel values and therefore is accurate to the pixel level. As a second exemplary step, a correspondence refinement step is performed to locate more precise correspondences between image points in a subset or all paired images from the stereo image sequences, based on the potential correspondences derived from the first step. The correspondence refinement can be performed by interpolating gray values in a subset of or all of the paired images from the stereo image sequences that are near the initial image points derived in the initial correspondence search. The correspondence refinement can be performed using sub-pixel values and therefore is more accurate than the pixel level analysis in the first step. In one or both steps, the normalized cross-correlation algorithm discussed above may be applied to derive the potential and/or precise correspondences between image points in the two images under analysis. All found and established stereo correspondences (e.g., that surpassed a certain metric, e.g., a similarity threshold) can be triangulated to calculate a 3D point per correspondence, where the whole set of points may be referred to as 3D data. Related description, including further details, may be found in commonly-owned PCT Publication No. WO2017220598A1, the entirety of which is incorporated herein by reference.

In some embodiments, as described herein, two cameras are used to capture stereo image sequences of the object where, after image acquisition, each image sequence includes 12-16 images of the object. In order to perform the correspondence assignment on the stereo image sequences from two cameras, the two steps described above may be performed. For the first step, the initial correspondence search may be performed to correlate each image point of the first image sequence to a corresponding image point of the second image sequence to find the image points with the highest correlation. In an example where each image-sequence includes 16 images, the correlation is performed by using the 16 temporal gray values of each image point as the correlation-"window" and correlating suitable pairs of image points from camera 1 and camera 2. At the end of the first step, the derived rough estimates provide potential candidates of potential correspondences, which are accurate to the pixel-level since the search was performed using the pixel values. For the second step, the correspondence refinement may be performed to derive more precise correspondences from the potential correspondences at sub-pixel accuracy. In the example where each image sequence includes 16 images, based on the gray value sequence for each pixel across the images in the first image sequence, the correspondence refinement process interpolates gray values in a subset or all of the paired images from the second image sequence that are near the initial image point derived in the first step. In this example, performing the correspondence refinement may include interpolating the gray values 16 times in the images from the second image sequence at a given subpixel-position. The correlation can be conducted on the temporal window of the image point of camera 1 and the interpolated temporal window at a subpixel-position of camera 2.

The techniques described herein analyze the change over time in regions of captured image sequences used to generate 3D data of a scene. The inventors have discovered and appreciated that various metrics can be used to determine and/or estimate whether motion is present in a scene, such as temporal modulation (e.g., the change in intensity over time, such as due to a rotating pattern being projected onto a scene) and/or correspondence density (e.g., the number of correspondences found between stereo image sequences during a correspondence search, compared to the overall number of possible correspondences). For example, the temporal modulation can be an indication of the pattern contrast over time at a particular location, such as by representing the maximum and minimum intensity over time, which may reflect motion if the temporal modulation is low. As another example, a correspondence search may be an indication of movement because a correspondence search may fail to find corresponding pixels at which motion is present. In some embodiments, the techniques compare the temporal modulation in spatial regions of the captured image sequences (e.g., smaller regions than the size of the overall captured images) with the achieved correspondence density in each of these regions to determine whether there is likely motion in the scene. For example, if a static object is present and the temporal sequence is well modulated, the image sequences will likely exhibit a high correspondence density and therefore not indicate movement in the scene. However, if the object is moving, the temporal sequence may still be well-modulated, but the correspondence-density is likely low.

Figure 5:
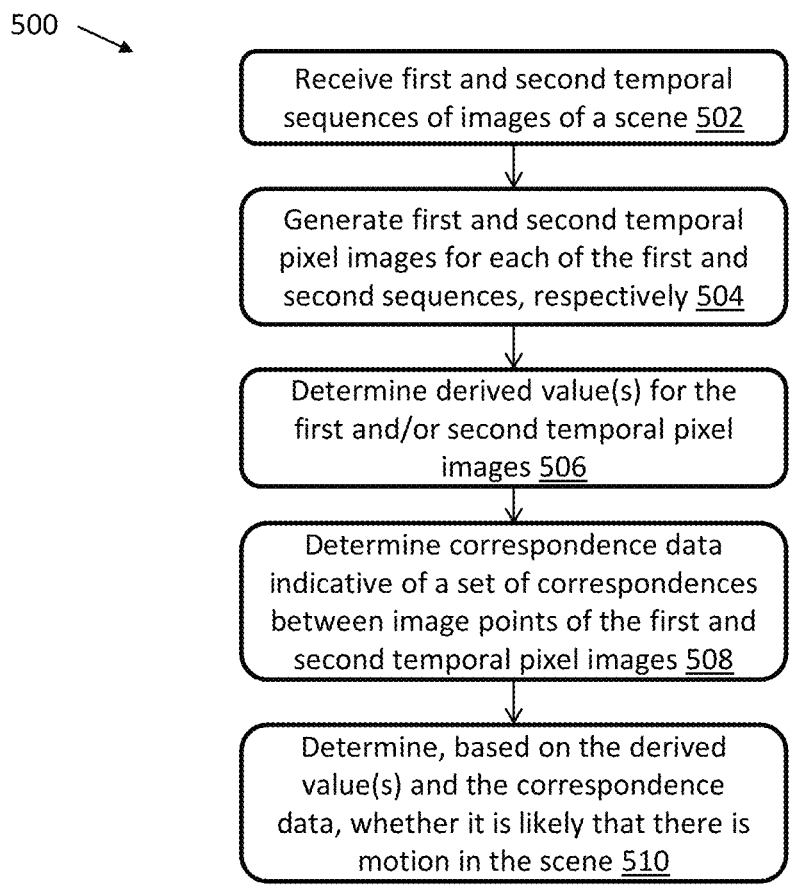
FIG. 5 shows an exemplary computerized method for determining whether motion is likely in a scene, according to some embodiments.

In some embodiments, the techniques described herein use temporal pixel images to determine whether there is movement in a scene. The techniques can include determining one or more derived values for the temporal pixels (e.g., a temporal average, a temporal RMSD, etc.), correspondence data, or both, and determining based on the temporal metric(s) and the correspondence data whether there is movement. FIG. 5 shows an exemplary computerized method 500 for determining whether motion is likely in a scene, according to some embodiments. At step 502, the computing device receives and/or accesses (e.g., from memory and/or local or remote storage or shared storage) first and second temporal sequences of images of a scene. At step 504, the computing device generates first and second temporal pixel images for each of the first and second sequences, respectively. At step 506, the computing device determines derived values for the first and second temporal pixel images. At step 508, the computing device determines correspondence data indicative of a set of correspondences between image points of the first and second temporal pixel images. At step 510, the computing device determines, based on the derived values and the correspondence data, whether it is likely that there is motion in the scene.

Referring to step 502, the computing device receives the temporal sequences of images of a scene over time. Each image in the temporal sequence of images can capture an associated portion of a light pattern projected onto the scene, such as a rotating pattern as described in conjunction with FIGS. 1-2. Each image in the first temporal sequence of images can be of a first perspective of the scene (e.g., as illustrated in conjunction with camera 106A), and each image in the second temporal sequence of images can be of a second perspective of the scene (e.g., as illustrated in conjunction with camera 106B).

Referring to step 504, the computing device generates the temporal pixel images. As discussed in conjunction with FIG. 4, each temporal pixel image includes a set of temporal pixels at an associated position (e.g., pixel) across the original image sequence. For example, the first temporal pixel image includes a set of temporal pixels, each temporal pixel including a set of pixel values at an associated pixel from each image of the first sequence of temporal images. Similarly, for example, each temporal pixel in the second temporal pixel image includes a set of pixel values at an associated pixel from each image of the second sequence of temporal images.

In some embodiments, the computing device can process the temporal pixel images to generate various data. For example, a stereo-image sequence obtained or captured during step 502 can be processed by normalizing the data and performing a temporal correlation to construct the 3D data. The computing device can generate one or more of a correspondence map, a mean map and a deviation map (e.g., an RMSD map). The correspondence map can indicate the correspondences between temporal pixels in one temporal pixel image to temporal pixels in another temporal pixel image. The mean map can indicate, for a temporal pixel image, how much the intensity changes for each temporal pixel. A RMSD map can indicate, for a temporal pixel image, the RMSD of the intensity for each temporal pixel.

At step 506, the computing device determines one or more derived values based on values of the temporal pixels in the first temporal pixel image, the second temporal pixel image, or both. The derived values can be determined, for example, using data determined at step 504, such as a correspondence map, a mean map, and/or an RMSD map. The derived values can include, for example, a temporal average indicative of an average of intensity values of the temporal pixel over time, a temporal deviation (e.g., a temporal root mean square deviation (RMSD)) indicative of a deviation of values of the temporal pixel, or both. For example, the temporal deviation can be an indication of the pattern contrast over time (e.g., an indication of the maximum and minimum intensity over time for a temporal pixel). The derived values can be determined for each of the temporal pixels and/or for a set of the temporal pixels in the temporal pixel image.

Figure 6:
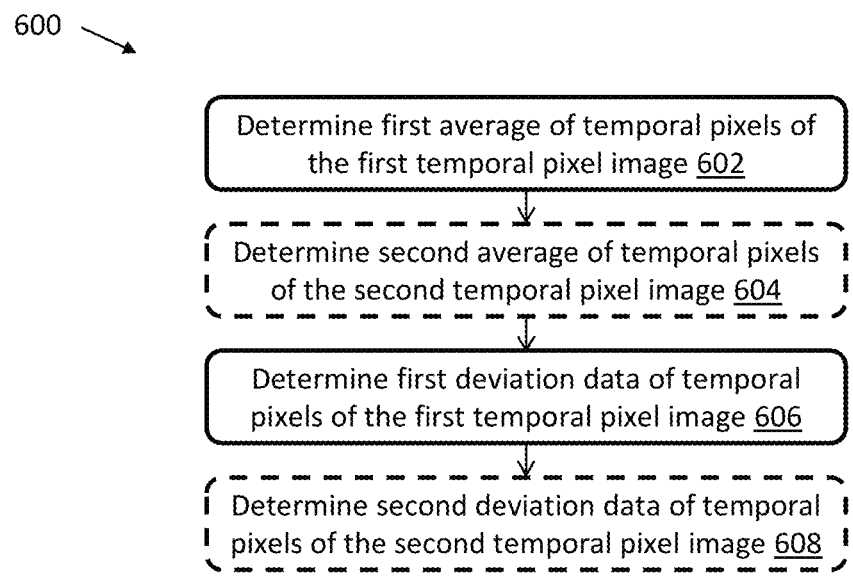
FIG. 6 shows an exemplary computerized method for determining average and deviation data for first and second temporal pixel images, according to some embodiments.

FIG. 6 shows an exemplary computerized method 600 for determining average and deviation data for first and second temporal pixel images, according to some embodiments. At step 602, the computing device determines a first average of temporal pixels of the first temporal pixel image. At step 604, the computing device optionally determines a second average of temporal pixels of the second temporal pixel image. At step 606, the computing device determines first deviation data of temporal pixels of the first temporal pixel image. At step 608, the computing device optionally determines second deviation data of temporal pixels of the second temporal pixel image.

As shown in FIG. 6, the computing device can be configured to determine derived values based only on a first temporal pixel image (e.g., steps 602 and 606) and may not determine derived values for the second temporal pixel image (e.g., steps 604 and 608). For example, a mean map and/or deviation map can be generated for each camera individually. In some embodiments, the techniques can be configured to use the mean map and/or deviation map associated with just one camera. In such an example, the temporal image sequence from the second camera can be used just for determining the corresponding pixels and thus the correspondence density as discussed herein. In some embodiments, the techniques may use a combination of derived values generated for both cameras (e.g., a combination of the mean map and/or deviation map from each camera).

Figure 7:
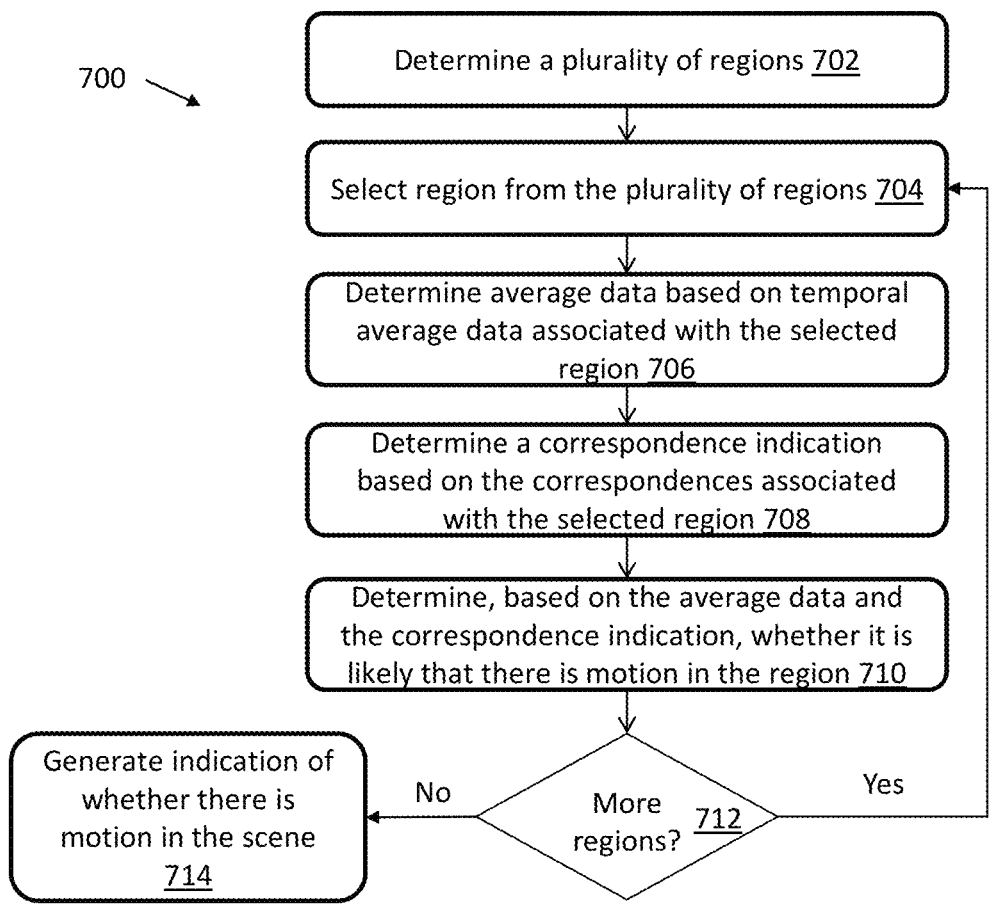
FIG. 7 shows an exemplary computerized method for analyzing a plurality of regions to determine whether motion is likely in the region, according to some embodiments.

Referring to steps 508 and 510, FIG. 7 shows an exemplary computerized method 700 for analyzing a plurality of regions to determine whether motion is likely in the region, according to some embodiments. At step 702, the computing device determines a plurality of regions. At step 704, the computing device selects a region from the plurality of regions. At step 706, the computing device determines average data based on temporal average data associated with the selected region. At step 708, the computing device determines a correspondence indication based on the correspondences associated with the selected region. At step 710, the computing device determines, based on the average data and the correspondence indication, whether it is likely that there is motion in the region. At step 712, the computing device determines whether there are more regions to analyze. If yes, the method proceeds back to step 704. If no, the method proceeds to step 714 and the computing device determines whether there is likely motion in the scene.

At step 702, the computing device determines a plurality of regions. For example, the computing device can break the original size of the images in the image sequences into a set of square regions, rectangular regions, and/or other regions useful for analyzing motion. In some embodiments, the techniques break the original images into a set of N by N square images (e.g., where N is 30, 40, 50, 80, etc. pixels). The techniques can analyze the computed temporal information associated with each region. For example, the techniques can analyze the derived values and/or correspondence data associated with each region (since such data can be specified based on the temporal pixel image). As shown by steps 704 and 712, the computing device can iterated through each region to analyze the region as described herein.

Referring to step 706, the computing device determines spatial average data across the region based on temporal average data associated with the selected region. For example, the computing device can determine spatial average data for the region. The techniques can include generating one or more maps of information for each of the regions in a temporal pixel image. In some embodiments, the computing device can determine the spatial average of the temporal average values (e.g., using mean values from the mean map) of each of the temporal pixels in the region, which the computing device can store as representative of the average mean of the region. The spatial average of the temporal average values can indicate, for example, how much change there is in intensity over time across the region. In some embodiments, the computing device can determine the spatial average of the temporal deviation values (e.g., using RMSD values from the RMSD map) of each of the temporal pixels in the region, which the computing device can store as representative of the average deviation of the region. The average deviation can be used as a confidence improvement to the determination since, for example, the average deviation can provide an indication of the changes in brightness. For example, the spatial deviation average can avoid a low-light and/or dark portion of the scene from causing the system to incorrectly determine there is motion for a particular region or regions.

At step 708, the computing device determines a correspondence indication based on the correspondences associated with the selected region. In some embodiments, the techniques can determine the correspondence indication based on the number of correspondences for the region. In some embodiments, the techniques can determine a correspondence density by dividing the number of correspondences found in the region to the total number of possible correspondences in the region. For example, the number of correspondences can be divided by the number of temporal pixels in the region (e.g., N×N). In some embodiments, a weighting can be applied to the correspondences prior to computing the correspondence density. For example, to only consider higher-quality correspondences, the techniques can determine a correlation score for each of the number of correspondences found in the region, and only include the correspondences with a correlation score that surpass a correlation threshold, such as 0.85, 0.90, or 0.95. The correlation score can be determined using the normalized cross-correlation discussed herein of the used temporal windows, which can have a value in the interval of [−1.0, 1.0].

At step 710, the computing device determines, based on the average data determined at step 706 and the correspondence indication determined at step 708, whether it is likely that there is motion in the region. In some embodiments, the computing device compares the average data and/or the correspondence indication to a metric. For example, the computing device can determine whether the average meets a first metric, determine whether the correspondence indication meets a second metric, and generate the motion indication for the region based on the comparisons. In some embodiments, the techniques can determine whether the correspondence density is less than a correspondence density threshold (e.g., 0.20, 0.25, 0.30, etc.), whether the average deviation (e.g., average RMSD) is greater than an average deviation threshold (e.g., 2.5, 3, 3.5, etc.), and/or whether the average deviation divided by the average mean is greater than a relative average deviation threshold (e.g., 0.190, 0.195, 0.196, 0.197, 0.200, etc.) to determine whether to mark the region as potentially containing motion.

Referring to step 714, the computing device analyzes the region indications for each of the regions to determine whether motion is in the scene. In some embodiments, the techniques can analyze the number of neighboring regions with region indications of motion. For example, the computing device can sum and/or determine the size of connected regions that indicate motion and use the result as indicator for motion in the whole scene. For example, the computing device can determine that if the number of regions for a cluster of connected regions is above a threshold (e.g. 10 regions), then the scene likely includes motion. As described herein, if the techniques identify a sufficient amount of potential motion in the scene, the information can be used downstream, such as to avoid providing a pick location that may be invalid due to motion of the object.

In some embodiments, the techniques may use a mask to ignore one or more regions of the scene (e.g., of the temporal pixel images). For example, a mask can be used to ignore areas in the camera's field of view that may not be relevant to the application (e.g., where movement may occur without causing an error). The mask can specify one or more areas of the captured images to ignore from testing using the techniques described herein. For example, the techniques can be configured to ignore one or more areas of motion caused due to the movement of a robot, or to ignore regions of a conveyor belt with moving parts that are not of interest to the application (e.g., in the background).

Figure 8:
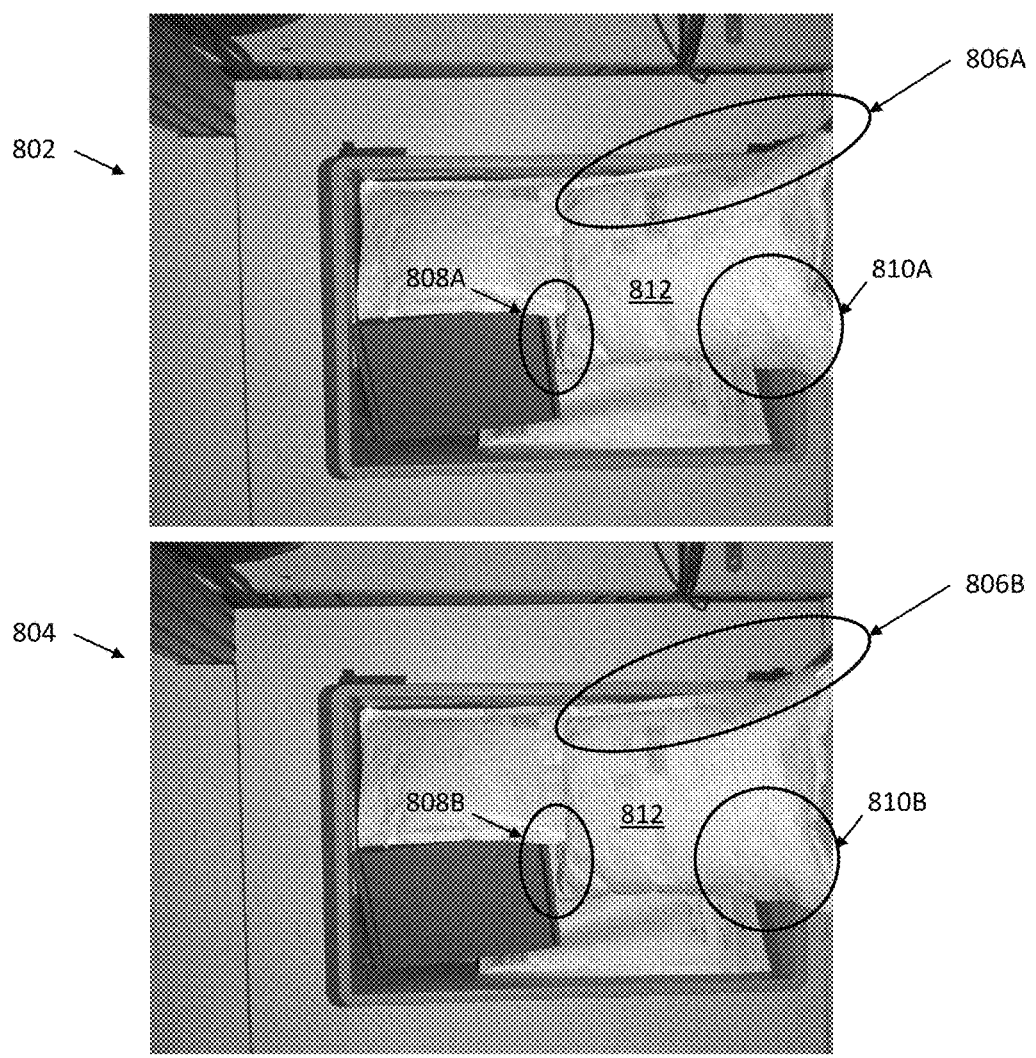
FIG. 8 shows sequential maximum images for the first and second half of the raw input images of one camera to illustrate motion for an example of the motion detection techniques according to some embodiments.

FIGS. 8-11 show exemplary images of various aspects of the techniques described herein. FIG. 8 shows sequential maximum images 802 and 804, which are the pixel-wise maximums of the first and second half of the sixteen raw input images of one camera, respectively, to illustrate motion for an example of the techniques according to some embodiments. While the raw images were captured, a random pattern was projected onto the scene and shifted over the scene, as described herein. The areas 806A/806B, 808A/808B, and 810A/810B show examples of motion in the scene captured between the maximum images 802 and 804. In this example, the envelope 812 shown in maximum image 802 shifts downwards in the scene in maximum image 804.

Figure 9:
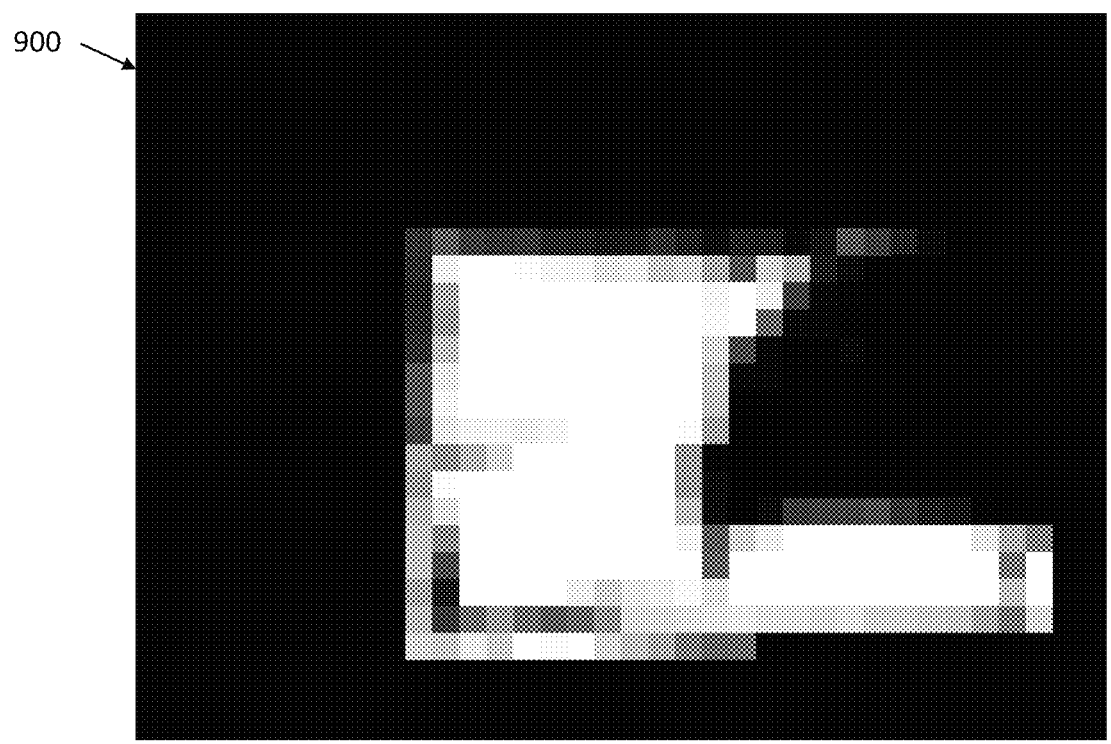
FIG. 9 shows an exemplary correspondence density map for different regions for the example of the motion detection techniques according to some embodiments.

FIG. 9 shows an exemplary correspondence density map 900 for different regions for the example of the techniques, according to some embodiments. The regions in this example are 40×40 pixels. For this example, for each region, the number of valid correspondences whose correlation score is above a threshold is divided by the region size (1600). In this example, the brighter an area or region, the higher the correspondence-density. For black areas there are no correspondences. For full white area there are all correspondences have been found.

Figure 10:
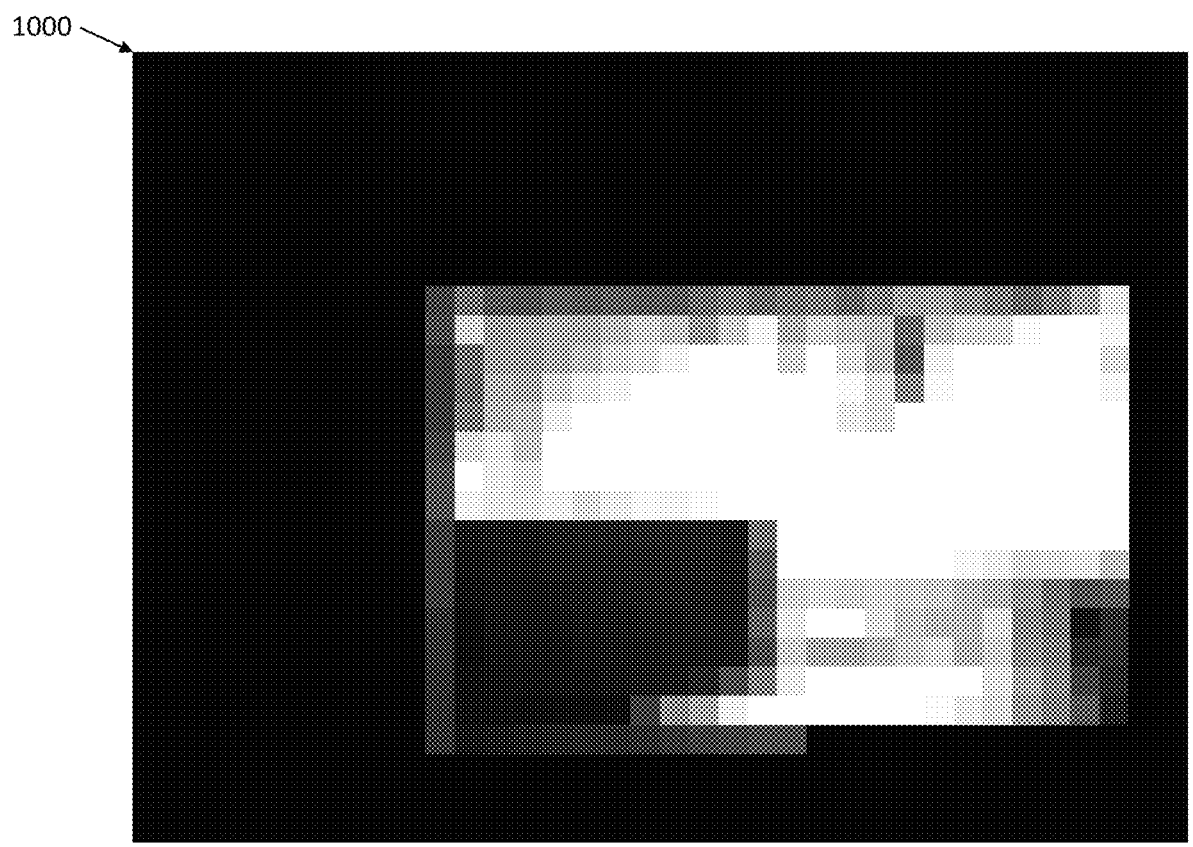
FIG. 10 shows an exemplary average temporal mean for different regions for the example of the motion detection techniques according to some embodiments.

FIG. 10 shows an exemplary average temporal mean map 1000 for different regions of 40×40 pixels for the example of the techniques, according to some embodiments. The mean map 1000 shows the spatial average of the temporal means of the temporal pixels in the different regions.

Figure 11:
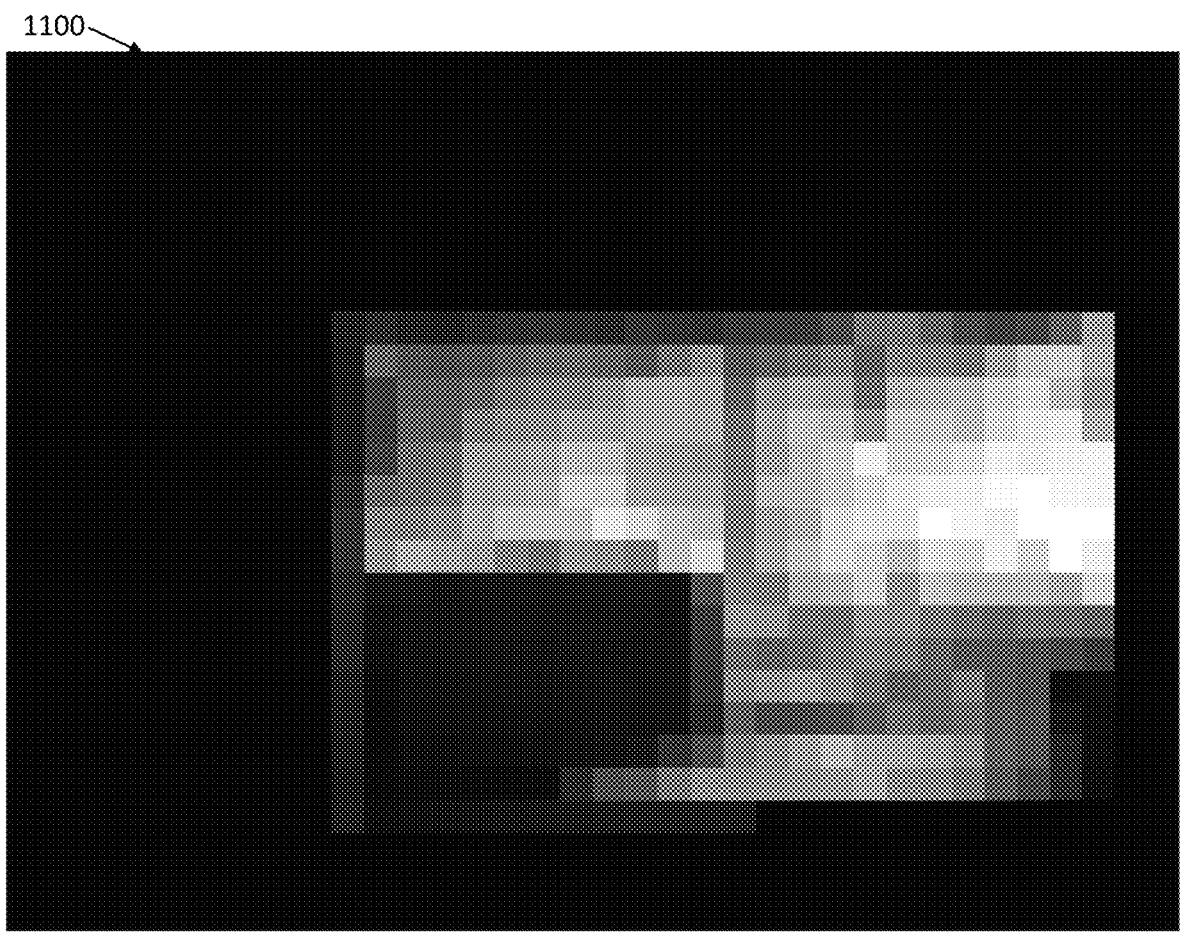
FIG. 11 shows an exemplary average deviation for different regions for the example of the motion detection techniques according to some embodiments.

FIG. 11 shows an exemplary average RMSD map 1100 for different regions of 40×40 pixels for the example of the techniques according to some embodiments. The average RMSD map 1100 shows the spatial average of the temporal RMSD values of the temporal pixels in the different regions.

Figure 12:
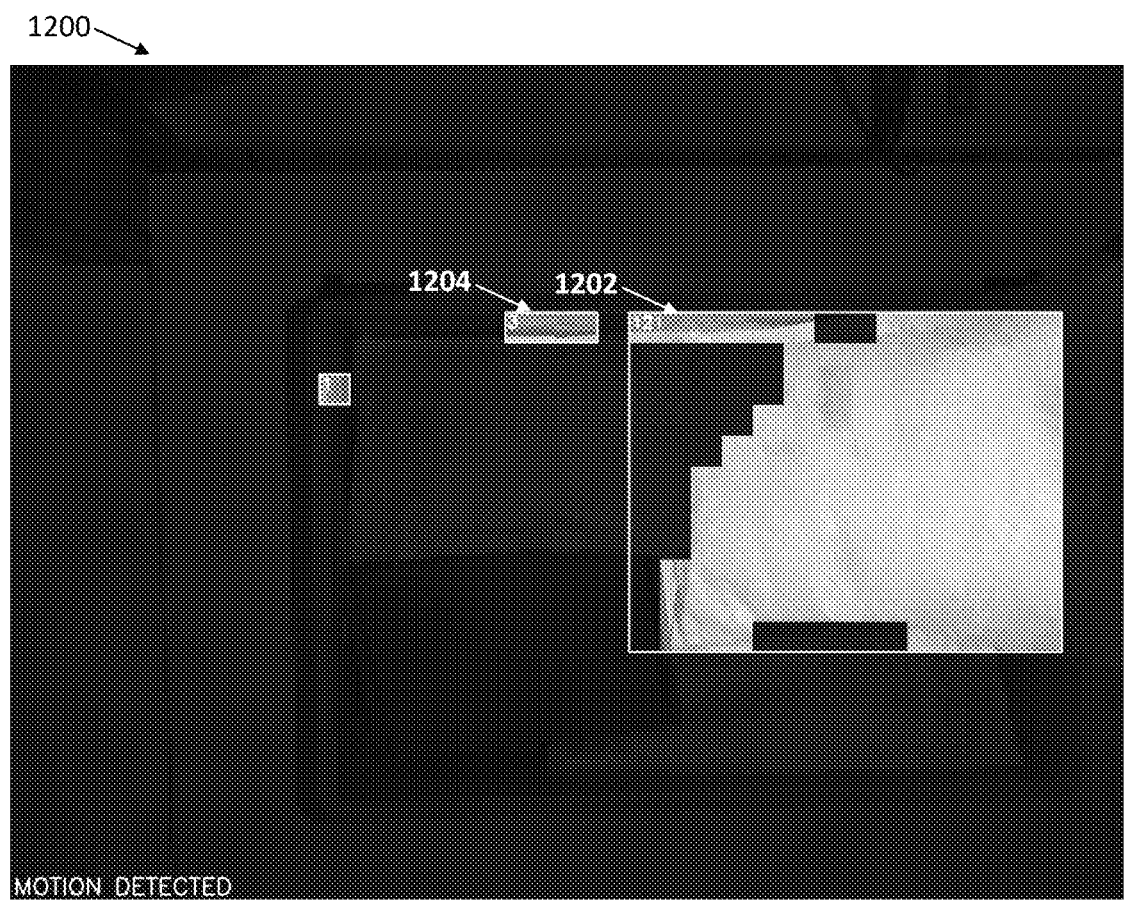
FIG. 12 shows an exemplary summary of motion for different regions for the example of the motion detection techniques according to some embodiments.

FIG. 12 shows an exemplary motion map 1200 showing motion areas for different regions of 40×40 pixels for the example of the techniques according to some embodiments. The motion map 1200 highlights regions in the image where potential motion was detected, such as regions 1202 and 1204. As described herein, the regions with motions can be regions with good image contrast/good pattern contrast, but few correspondence points and therefore a low correspondence density. By graphically illustrating motion regions using the motion map 1200, the motion map 1200 can visualize the size of the connected motion regions. The techniques can sum the number of connected motion candidate regions, and if the number is above a threshold, indicate the image has motion.

While the techniques disclosed herein have been discussed in conjunction with stereo approaches (e.g., temporal stereo approaches, such as sequence acquisition), the techniques are no so limited. For example, the techniques may be used for single-image approaches (e.g., active & passive techniques).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects are described in this disclosure, which include, but are not limited to, the following aspects:

(1) A system for detecting movement in a scene, the system comprising a processor in communication with memory, the processor being configured to execute instructions stored in memory that cause the processor to:

access a first set of images and a second set of images of a scene over time;

generate, based on the first set of images, a first temporal pixel image comprising a first set of temporal pixels, wherein each temporal pixel in the first set of temporal pixels comprises a set of pixel values at an associated position from each image of the first set of images;

generate, based on the second set of images, a second temporal pixel image comprising a second set of temporal pixels, wherein each temporal pixel in the second set of temporal pixels comprises a set of pixel values at an associated position from each image of the second set of images;

determine one or more derived values based on values of the temporal pixels in the first temporal pixel image, the second temporal pixel image, or both;

determine, based on the first temporal pixel image and the second temporal pixel image, correspondence data indicative of a set of correspondences between image points of the first set of images and image points of the second set of images; and determine, based on the one or more derived values and the correspondence data, an indication of whether there is a likelihood of motion in the scene.

(2) The system of (1), wherein determining the one or more derived values comprises:

determining a first set of derived values based on values of the temporal pixels in the first temporal pixel image; and determining a second set of derived values based on values of the temporal pixels in the second temporal pixel image.

(3) The system of any of (1)-(2), wherein determining the one or more derived values comprises:

determining, for each temporal pixel of a first set of temporal pixels of the first temporal pixel image, first average data indicative of an average of values of the temporal pixel; and determining, for each temporal pixel of the first set of temporal pixels, first deviation data indicative of a deviation of values of the temporal pixel.

(4) The system of any of (1)-(3), wherein determining the one or more derived values further comprises:

determining, for each temporal pixel of a second set of temporal pixels of the second temporal pixel image, second average data indicative of an average of values of the temporal pixel; and determining, for each temporal pixel of the second set of temporal pixels, second deviation data indicative of a deviation of values of the temporal pixel.

(5) The system of any of (1)-(4), wherein calculating the first average data comprises calculating, for each temporal pixel in the first set of temporal pixels:

a temporal average of intensity values of the temporal pixel; and a root mean square deviation of the intensity values of the temporal pixel.

(6) The system of any of (1)-(5), wherein determining the indication comprises:

determining a plurality of regions of the first temporal pixel image, the second temporal pixel image, or both; and determining, for each region of the plurality of regions:
an average of the one or more derived values associated with the region;
a correspondence indication based on correspondences associated with the region; and
determining, based on the average and the correspondence indication, a region indication of whether there is a likelihood of motion in the region.

(7) The system of any of (1)-(6), wherein determining the region indication comprises:

determining the average meets a first metric;

determining the correspondence indication meets a second metric; and generating the region indication to indicate a likelihood of motion in the region.

(8) The system of any of (1)-(7), further comprising determining, based on a set of region indications associated with each region of the plurality of regions, an indication to indicate a likelihood of motion in the scene.

(9) The system of any of (1)-(8), wherein:

each image in the first set of images and the second set of images captures an associated portion of a light pattern projected onto the scene;

each image in the first set of images is of a first perspective of the scene; and each image in the second set of images is of a second perspective of the scene.

(10) The system of any of (1)-(9), wherein:

each image in the first set of images is captured by a camera; and each image in the second set of images comprises a portion of a pattern sequence projected onto the scene by a projector.

(11) A computerized method for detecting movement in a scene, the method comprising:

accessing a first set of images and a second set of images of a scene over time;

generating, based on the first set of images, a first temporal pixel image comprising a first set of temporal pixels, wherein each temporal pixel in the first set of temporal pixels comprises a set of pixel values at an associated position from each image of the first set of images;

generating, based on the second set of images, a second temporal pixel image comprising a second set of temporal pixels, wherein each temporal pixel in the second set of temporal pixels comprises a set of pixel values at an associated position from each image of the second set of images;

determining one or more derived values based on values of the temporal pixels in the first temporal pixel image, the second temporal pixel image, or both;

determining, based on the first temporal pixel image and the second temporal pixel image, correspondence data indicative of a set of correspondences between image points of the first set of images and image points of the second set of images; and determining, based on the one or more derived values and the correspondence data, an indication of whether there is a likelihood of motion in the scene.

(12) The method of (11), wherein determining the one or more derived values comprises:

determining a first set of derived values based on values of the temporal pixels in the first temporal pixel image; and determining a second set of derived values based on values of the temporal pixels in the second temporal pixel image.

(13) The method of any of (11)-(12), wherein determining the one or more derived values comprises:

determining, for each temporal pixel of a first set of temporal pixels of the first temporal pixel image, first average data indicative of an average of values of the temporal pixel; and determining, for each temporal pixel of the first set of temporal pixels, first deviation data indicative of a deviation of values of the temporal pixel.

(14) The method of any of (11)-(13), wherein determining the one or more derived values further comprises:

determining, for each temporal pixel of a second set of temporal pixels of the second temporal pixel image, second average data indicative of an average of values of the temporal pixel; and determining, for each temporal pixel of the second set of temporal pixels, second deviation data indicative of a deviation of values of the temporal pixel.

(15) The method of any of (11)-(14), wherein calculating the first average data comprises calculating, for each temporal pixel in the first set of temporal pixels:

a temporal average of intensity values of the temporal pixel; and a root mean square deviation of the intensity values of the temporal pixel.

(16) The method of any of (11)-(15), wherein determining the indication comprises:

determining a plurality of regions of the first temporal pixel image, the second temporal pixel image, or both; and determining, for each region of the plurality of regions:
an average of the one or more derived values associated with the region;
a correspondence indication based on correspondences associated with the region; and determining, based on the average and the correspondence indication, a region indication of whether there is a likelihood of motion in the region.

(17) The method of any of (11)-(16), wherein determining the region indication comprises:

determining the average meets a first metric;

determining the correspondence indication meets a second metric; and generating the region indication to indicate a likelihood of motion in the region.

(18) The method of any of (11)-(17), further comprising determining, based on a set of region indications associated with each region of the plurality of regions, an indication to indicate a likelihood of motion in the scene.

(19) The method of any of (11)-(18), wherein:

each image in the first set of images and the second set of images captures an associated portion of a light pattern projected onto the scene;

each image in the first set of images is of a first perspective of the scene; and each image in the second set of images is of a second perspective of the scene.

(20) At least one non-transitory computer-readable storage medium storing processor-executable instructions that, when executed by at least one computer hardware processor, cause the at least one computer hardware processor to perform the acts of:

accessing a first set of images and a second set of images of a scene over time;

generating, based on the first set of images, a first temporal pixel image comprising a first set of temporal pixels, wherein each temporal pixel in the first set of temporal pixels comprises a set of pixel values at an associated position from each image of the first set of images;

generating, based on the second set of images, a second temporal pixel image comprising a second set of temporal pixels, wherein each temporal pixel in the second set of temporal pixels comprises a set of pixel values at an associated position from each image of the second set of images;

determining one or more derived values based on values of the temporal pixels in the first temporal pixel image, the second temporal pixel image, or both;

determining, based on the first temporal pixel image and the second temporal pixel image, correspondence data indicative of a set of correspondences between image points of the first set of images and image points of the second set of images; and determining, based on the one or more derived values and the correspondence data, an indication of whether there is a likelihood of motion in the scene.

(21) The non-transitory computer-readable storage medium of (20), further configured to perform one or more of the steps of any of (1)-(19).

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A system for detecting movement of an object in a scene, the system comprising a processor in communication with memory, the processor being configured to execute instructions stored in memory that cause the processor to:

access a first set of images and a second set of images of a scene over time;

generate, based on the first set of images, a first temporal pixel image comprising a first set of temporal pixels, wherein each temporal pixel in the first set of temporal pixels comprises a set of pixel values at an associated position from each image of the first set of images;

generate, based on the second set of images, a second temporal pixel image comprising a second set of temporal pixels, wherein each temporal pixel in the second set of temporal pixels comprises a set of pixel values at an associated position from each image of the second set of images;

determine one or more derived values based on values of the temporal pixels in the first temporal pixel image, the second temporal pixel image, or both;

determine, based on the first temporal pixel image and the second temporal pixel image, a correspondence density indicative of a relationship between a number of a set of identified correspondences between image points of the first set of images and image points of the second set of images and a number of possible correspondences;

determine, based on the one or more derived values and the correspondence density, an indication of whether there is a likelihood of motion of an object in the scene; and based on determining that there is a likelihood of motion of the object in the scene, determine a position of the object in the scene at a future time subsequent to a time related to when the first set of images and the second set of images were captured.

2. The system of claim 1, wherein determining the one or more derived values comprises:

determining a first set of derived values based on values of the temporal pixels in the first temporal pixel image; and determining a second set of derived values based on values of the temporal pixels in the second temporal pixel image.

3. The system of claim 1, wherein determining the one or more derived values comprises:

determining, for each temporal pixel of a first set of temporal pixels of the first temporal pixel image, first average data indicative of an average of values of the temporal pixel; and determining, for each temporal pixel of the first set of temporal pixels, first deviation data indicative of a deviation of values of the temporal pixel.

4. The system of claim 3, wherein determining the one or more derived values further comprises:

determining, for each temporal pixel of a second set of temporal pixels of the second temporal pixel image, second average data indicative of an average of values of the temporal pixel; and determining, for each temporal pixel of the second set of temporal pixels, second deviation data indicative of a deviation of values of the temporal pixel.

5. The system of claim 3, wherein calculating the first average data comprises calculating, for each temporal pixel in the first set of temporal pixels:

a temporal average of intensity values of the temporal pixel; and a root mean square deviation of the intensity values of the temporal pixel.

6. The system of claim 1, wherein determining the indication comprises:

determining a plurality of regions of the first temporal pixel image, the second temporal pixel image, or both; and determining, for each region of the plurality of regions:
an average of the one or more derived values associated with the region;
a correspondence indication based on correspondences associated with the region; and
determining, based on the average and the correspondence indication, a region indication of whether there is a likelihood of motion in the region.

7. The system of claim 6, wherein determining the region indication comprises:
determining the average meets a first metric;
determining the correspondence indication meets a second metric; and
generating the region indication to indicate a likelihood of motion in the region.

8. The system of claim 7, further comprising determining, based on a set of region indications associated with each region of the plurality of regions, an indication to indicate a likelihood of motion in the scene.

9. The system of claim 1, wherein:
each image in the first set of images and the second set of images captures an associated portion of a light pattern projected onto the scene;
each image in the first set of images is of a first perspective of the scene; and
each image in the second set of images is of a second perspective of the scene.

10. The system of claim 1, wherein:
each image in the first set of images is captured by a camera; and
each image in the second set of images comprises a portion of a pattern sequence projected onto the scene by a projector.

11. A computerized method for detecting movement of an object in a scene, the method comprising:
accessing a first set of images and a second set of images of a scene over time;
generating, based on the first set of images, a first temporal pixel image comprising a first set of temporal pixels, wherein each temporal pixel in the first set of temporal pixels comprises a set of pixel values at an associated position from each image of the first set of images;
generating, based on the second set of images, a second temporal pixel image comprising a second set of temporal pixels, wherein each temporal pixel in the second set of temporal pixels comprises a set of pixel values at an associated position from each image of the second set of images;
determining one or more derived values based on values of the temporal pixels in the first temporal pixel image, the second temporal pixel image, or both;
determining, based on the first temporal pixel image and the second temporal pixel image, a correspondence density indicative of a relationship between a number of a set of identified correspondences between image points of the first set of images and image points of the second set of images and a number of possible correspondences;
determining, based on the one or more derived values and the correspondence density, an indication of whether there is a likelihood of motion of an object in the scene; and based on determining that there is a likelihood of motion of the object in the scene, determine a position of the object in the scene at a future time subsequent to a time related to when the first set of images and the second set of images were captured.

12. The method of claim 11, wherein determining the one or more derived values comprises:
determining a first set of derived values based on values of the temporal pixels in the first temporal pixel image; and
determining a second set of derived values based on values of the temporal pixels in the second temporal pixel image.

13. The method of claim 11, wherein determining the one or more derived values comprises:
determining, for each temporal pixel of a first set of temporal pixels of the first temporal pixel image, first average data indicative of an average of values of the temporal pixel; and
determining, for each temporal pixel of the first set of temporal pixels, first deviation data indicative of a deviation of values of the temporal pixel.

14. The method of claim 13, wherein determining the one or more derived values further comprises:
determining, for each temporal pixel of a second set of temporal pixels of the second temporal pixel image, second average data indicative of an average of values of the temporal pixel; and
determining, for each temporal pixel of the second set of temporal pixels, second deviation data indicative of a deviation of values of the temporal pixel.

15. The method of claim 13, wherein calculating the first average data comprises calculating, for each temporal pixel in the first set of temporal pixels:
a temporal average of intensity values of the temporal pixel; and
a root mean square deviation of the intensity values of the temporal pixel.

16. The method of claim 11, wherein determining the indication comprises:
determining a plurality of regions of the first temporal pixel image, the second temporal pixel image, or both; and
determining, for each region of the plurality of regions:
an average of the one or more derived values associated with the region;
a correspondence indication based on correspondences associated with the region; and
determining, based on the average and the correspondence indication, a region indication of whether there is a likelihood of motion in the region.

17. The method of claim 16, wherein determining the region indication comprises:
determining the average meets a first metric;
determining the correspondence indication meets a second metric; and
generating the region indication to indicate a likelihood of motion in the region.

18. The method of claim 17, further comprising determining, based on a set of region indications associated with each region of the plurality of regions, an indication to indicate a likelihood of motion in the scene.

19. The method of claim 11, wherein:
each image in the first set of images and the second set of images captures an associated portion of a light pattern projected onto the scene;

each image in the first set of images is of a first perspective of the scene; and each image in the second set of images is of a second perspective of the scene.

20. At least one non-transitory computer-readable storage medium storing processor-executable instructions that, when executed by at least one computer hardware processor, cause the at least one computer hardware processor to perform the acts of:

accessing a first set of images and a second set of images of a scene over time;

generating, based on the first set of images, a first temporal pixel image comprising a first set of temporal pixels, wherein each temporal pixel in the first set of temporal pixels comprises a set of pixel values at an associated position from each image of the first set of images;

generating, based on the second set of images, a second temporal pixel image comprising a second set of temporal pixels, wherein each temporal pixel in the second set of temporal pixels comprises a set of pixel values at an associated position from each image of the second set of images;

determining one or more derived values based on values of the temporal pixels in the first temporal pixel image, the second temporal pixel image, or both;

determining, based on the first temporal pixel image and the second temporal pixel image, a correspondence density indicative of a relationship between a number of a set of identified correspondences between image points of the first set of images and image points of the second set of images and a number of possible correspondences;

determining, based on the one or more derived values and the correspondence density, an indication of whether there is a likelihood of motion of an object in the scene; and based on determining that there is a likelihood of motion of the object in the scene, determine a position of the object in the scene at a future time subsequent to a time related to when the first set of images and the second set of images were captured.

* * * * *